United States Patent
Odulinski et al.

(10) Patent No.: US 8,037,016 B2
(45) Date of Patent: Oct. 11, 2011

(54) ADAPTIVE STORAGE SYSTEM TRANSCODER

(75) Inventors: Bogdan Odulinski, Austin, TX (US);
James C. Lowery, Austin, TX (US);
Jimmy D. Pike, Georgetown, TX (US);
Drue Reeves, Round Rock, TX (US);
Brent Schroeder, Bee Cave, TX (US)

(73) Assignee: Dell Products L.P., Round Rock, TX (US)

(*) Notice: Subject to any disclaimer, the term of this patent is extended or adjusted under 35 U.S.C. 154(b) by 434 days.

(21) Appl. No.: 12/170,164

(22) Filed: Jul. 9, 2008

(65) Prior Publication Data
US 2010/0011014 A1 Jan. 14, 2010

(51) Int. Cl.
*G06F 17/30* (2006.01)
(52) U.S. Cl. ......... 707/602; 707/693; 707/756; 707/776
(58) Field of Classification Search .................. 707/756, 707/602, 776, 693; 709/246; 715/200, 523; 711/154; 713/162
See application file for complete search history.

(56) References Cited

U.S. PATENT DOCUMENTS

| | | | |
|---|---|---|---|
| 7,647,549 B2* | 1/2010 | Denoual et al. | 715/200 |
| 2001/0039615 A1* | 11/2001 | Bowker et al. | 713/162 |
| 2004/0030995 A1* | 2/2004 | Bhogal et al. | 715/523 |
| 2006/0288185 A1 | 12/2006 | Brisse et al. | |
| 2007/0033190 A1* | 2/2007 | Dodaro et al. | 707/9 |
| 2007/0061522 A1* | 3/2007 | Vink | 711/154 |
| 2007/0239896 A1* | 10/2007 | Sohn et al. | 709/246 |
| 2008/0001791 A1* | 1/2008 | Wanigasekara-Mohotti et al. | 341/50 |
| 2008/0155230 A1* | 6/2008 | Robbins et al. | 712/1 |
| 2009/0079560 A1* | 3/2009 | Fries et al. | 340/539.22 |
| 2009/0226102 A1* | 9/2009 | Huang et al. | 382/233 |
| 2009/0259462 A1* | 10/2009 | Wildfeuer et al. | 704/226 |

* cited by examiner

*Primary Examiner* — Frantz Coby
(74) *Attorney, Agent, or Firm* — Hamilton & Terrile, LLP; Gary W. Hamilton

(57) ABSTRACT

A system and method are disclosed for the transcoding of data from a first format to a second format. A data format transcoder receives a request for data from a requester. The desired format of the requested data is determined. A descriptor file containing formatting information describing the requested format is loaded into the data format transcoder. The requested data is retrieved in its native format along with its corresponding common descriptor. The requested data is read in its native format, using the formatting information from its associated common descriptor. The data format transcoder then uses the formatting information in the common descriptor of the requested format to perform transcoding operations to convert the requested data from its native format into the requested format.

20 Claims, 10 Drawing Sheets

ADAPTIVE STORAGE SYSTEM TRANSCODER

BACKGROUND OF THE INVENTION

1. Field of the Invention

Embodiments of the invention relate generally to information handling systems. More specifically, embodiments of the invention provide a system and method for the transcoding of data formats.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today's enterprises face many challenges, including reducing the total cost of ownership (TCO) of their information processing operations. One approach that has gained popularity in recent years is virtualization, which allows a single resource, such as a server, an operating system, an application, or storage device appear to function as multiple logical resources. Conversely, virtualization can also make multiple physical resources, such as storage devices or servers appear as a single logical resource. Platform virtualization is achieved with a layer of software that separates the physical components of a host computer from instances of a virtual machine (VM). Each instance of a virtual machine (VM) is a separate software simulation of a computer and has its own operating system (OS), generally referred to as the guest OS. Each VM, with its corresponding guest OS, is encapsulated in a virtual disk file that can be moved or copied to any physical computer with sufficient processing power and memory to run it. When executed, each VM runs its own applications independently, as if it were the only system operating on the host hardware.

However, the layer of virtualization software that allows multiple VMs to run on a host, as well as the format of the virtual disk file containing an individual VM, is proprietary to each virtualization vendor. Current vendors include Microsoft, which uses the Virtual Hard Disk (VHD) format, and VMWare, which uses the Virtual Machine DisK (VMDK) format. As a result, VMs stored in VHD format files will only run on host machines implemented with Microsoft virtualization software. Conversely, VMs stored in VMDK format files will only run on host machines implemented with VMWare virtualization software. This restriction creates issues in heterogeneous operating environments as physical resources may be available, but not usable by a VM if it is stored in an incompatible virtual file format.

Current approaches to this issue include virtual file conversion applications, such as the Vmdk2Vhd file converter produced by the vmToolkit organization (www.vmtoolkit.org). Using a sector-by-sector copy operation, it converts a virtual file stored in VMWare's VMDK format to Microsoft's VHD format. While this allows a VM originally created for use with VMWare to run on a Microsoft platform, it is primarily intended for one-time conversions, not for dynamic virtual-to-virtual (V2V) transfers of a VM from one virtual execution environment to another. Similar issues are introduced when a VM is moved to a physical machine in a virtual-to-physical physical (V2P) transfer, such as when the hard disk contents of a failed server are restored from a VM image stored on a backup storage medium. As a result, it is not unusual for a large information technology (IT) operation to store the same VM configuration in different multiple file formats. This multiplicity of file formats increases data storage costs and operational overhead while simultaneously creating the opportunity for errors.

SUMMARY OF THE INVENTION

A system and method are disclosed for the transcoding of data from a first format to a second format. In various embodiments, a data format transcoder receives a request for data from a data requester, such as a virtual machine manager (VMM), or hypervisor running on a virtual machine (VM) host. The desired format of the requested data is determined, followed by the location of a common descriptor file containing formatting information describing the requested format. In one embodiment, the common descriptor file is represented as an object stored in a directory repository of objects and is retrieved by the data format transcoder using a directory services stack. Once located and retrieved, the common descriptor of the requested format is loaded into the data format transcoder. The data format transcoder then issues commands to retrieve the requested data in its native format along with its corresponding common descriptor.

The data format transcoder then reads the sets of non-vendor-specific and vendor-specific formatting information elements from the common descriptor associated with the native format of the requested format. The requested data is read in its native format, using the formatting information from its associated common descriptor. The data format transcoder then uses the formatting information in the common descriptor of the requested format to perform transcoding operations to convert the requested data from its native format into the requested format. The data format transcoder then transfers the requested data in its transcoded format to the data requester. In various embodiments, the transcoding operations allow data stored in one format to work on a different platform or operating system requiring a different format.

In one embodiment, the transcoding of data file formats is physical-to-physical (P2P). Data is retrieved from its location on a first physical storage device and transcoded from a first format to a second format and then stored on a second physical storage device. In another embodiment, the transcoding of data file formats is physical-to-virtual (P2V). Data is retrieved from its location on a physical storage device and transcoded from a first format to a second format and then executed on a virtual machine. In yet another embodiment, the transcoding of data file formats is virtual-to-physical (V2P). Data is retrieved from its virtual execution environment and transcoded from a first format to a second, requested format and then stored on a physical storage device. In a different embodiment, the transcoding of data file formats is virtual-to-virtual (V2V). Data is retrieved from a first virtual execution environment and transcoded from a first format to a second format and then executed in a second virtual execution environment. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The present invention provides a system and method for the transcoding of data from a first format to a second format. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
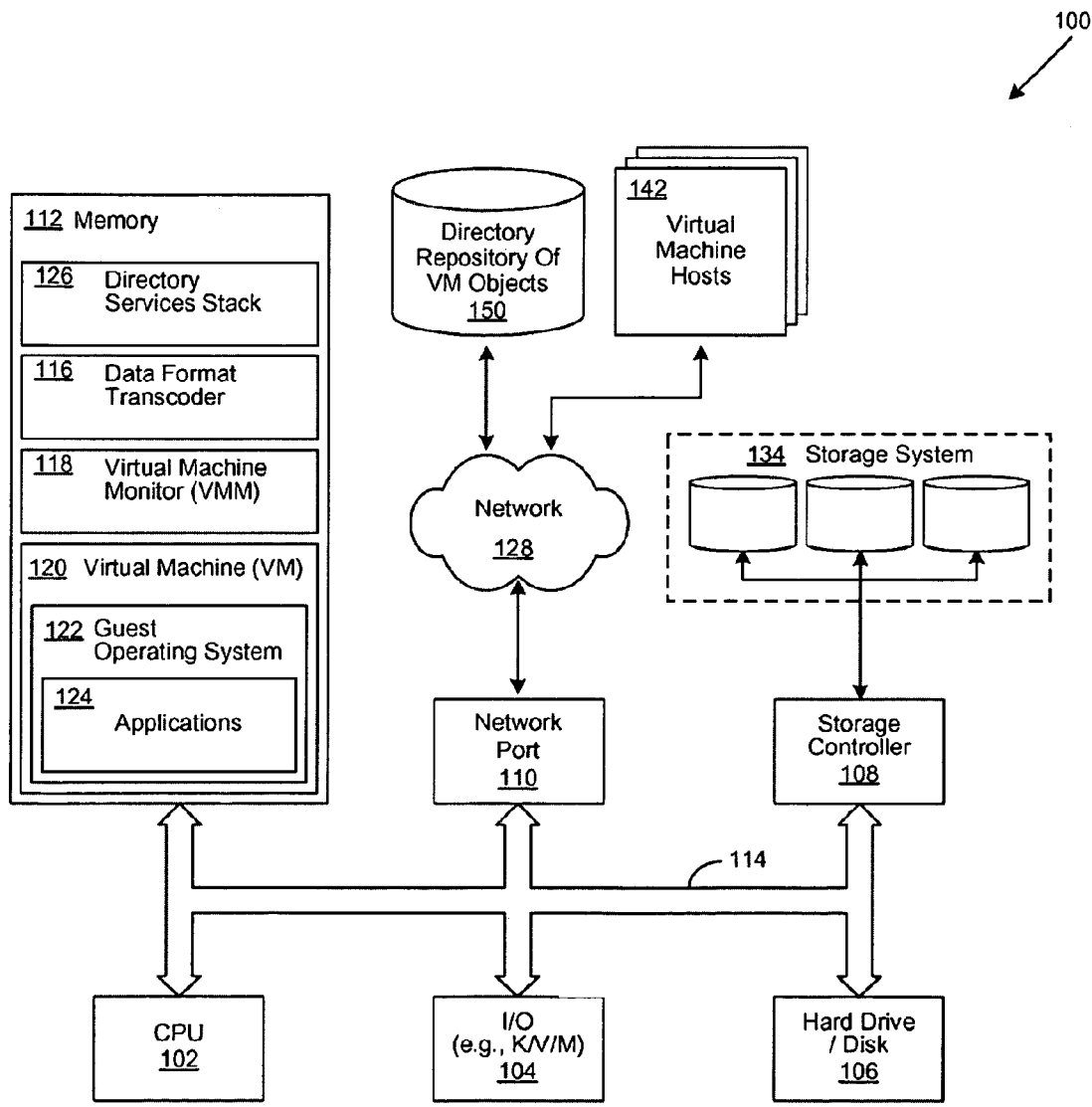
FIG. 1 is a general illustration of components of an information handling system as implemented in the system and method of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, storage controller 108, network port 110 operable to connect to a network 128, and system memory 112, all interconnected via one or more buses 114. The storage controller 108 is operable to be connected to storage subsystem 134. In various embodiments of the invention, storage system 134 may comprise a physically connected storage system, a network attached storage (NAS) system, or a storage area network (SAN). The storage system 134 may further comprise a storage controller coupled to a plurality of storage devices, such as a disk drive, a tape drive, or other storage device, each comprising a storage medium. System memory 112 further comprises data format transcoder 116, directory service stack 126, virtual machine manager (VMM) 118, and virtual machine (VM) 120, further comprising guest operating system 122, and one or more applications 124. The directory service stack 126 is operable to provide network connectivity through network 128 for the VMM 118 to access the directory repository of VM objects 150. The data format transcoder 116 is able to connect through the network 128 to similarly access the directory repository of VM objects 150.

Figure 2:
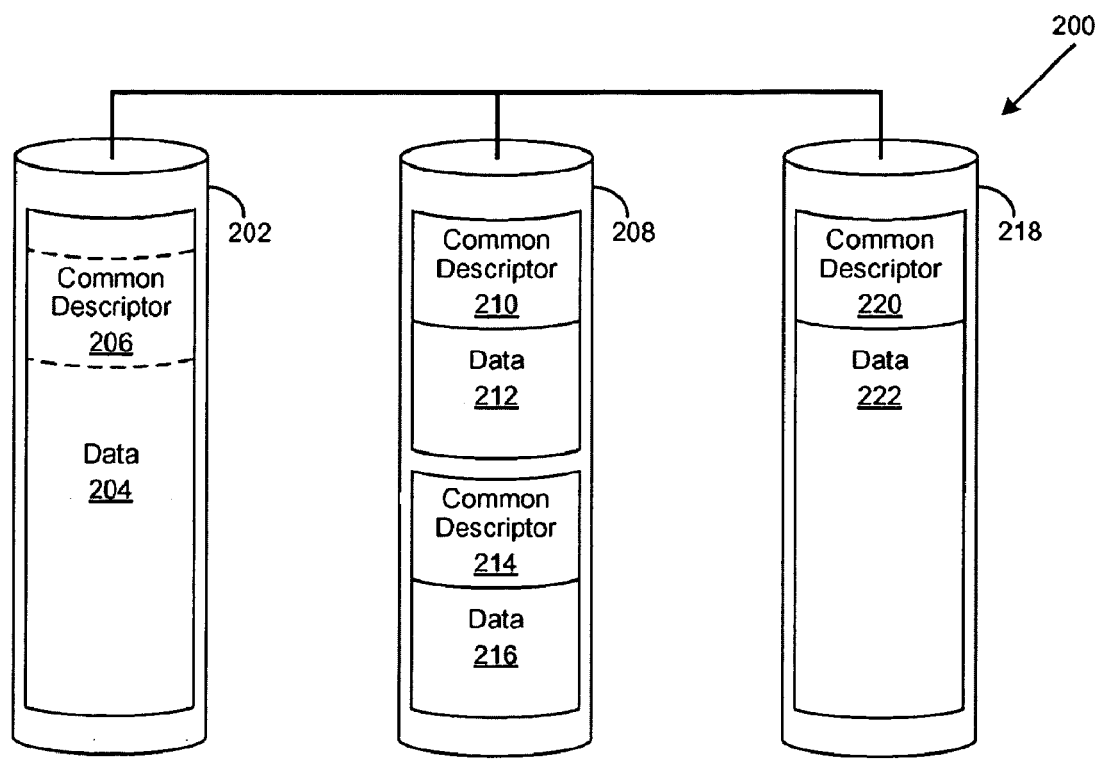
FIG. 2 is a generalized block diagram of a storage system as implemented in accordance with an embodiment of the invention.

FIG. 2 is a generalized block diagram of a storage system 200 as implemented in accordance with an embodiment of the invention. In various embodiments, a common descriptor 206, 210, 214, 220 is implemented to describe the format of data 204, 212, 216, 222 contained in the storage devices 202, 208, 218 of storage system 200. In these and other embodiments, storage devices 202, 208, 218 may be hard disk drives, removable media drives, tape drives, flash memory drives, or any other storage device operable to control the storage of data on a storage medium. In different embodiments, the storage system 200 is implemented as a storage area network (SAN) with storage servers and other network-based storage components familiar to those of skill in the art.

The storage system 200 may include any number of data files with embedded common descriptors or data and common descriptor file pairs. In one embodiment, the common descriptor 206 is embedded within a data file 204 or within a data stream. In another embodiment, data files 212, 216 are stored in different formats in a single storage medium contained in storage drive 208. Their corresponding common descriptors 210, 214 likewise reside on the same storage medium and describe the respective format of data 212, 216. In yet another embodiment all data 222 of storage device 218 is stored in the same format, described by its corresponding common descriptor 220. The format of common descriptor 206, 210, 214, 220 may be proprietary or based upon an industry standard. In one embodiment, the common descriptor is written in extensible Markup Language (XML).

Figure 3:
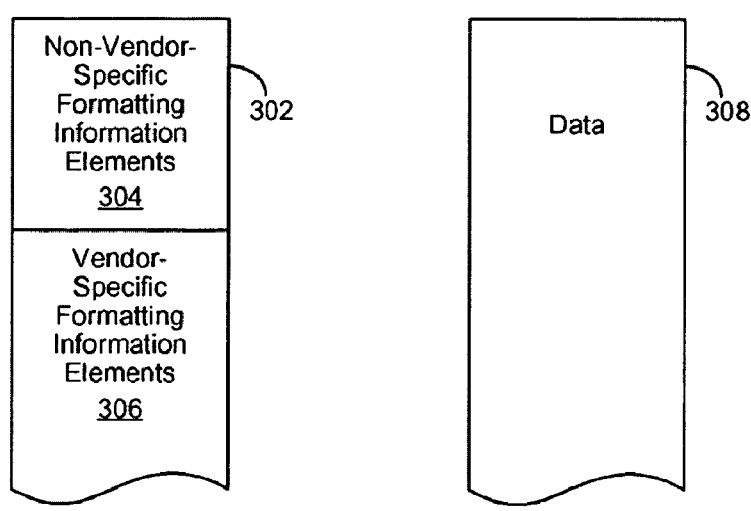
FIG. 3 is a simplified block diagram of a common descriptor file as implemented in accordance with an embodiment of the invention.

FIG. 3 is a simplified block diagram of a common descriptor file 302 as implemented in accordance with an embodiment of the invention. In this embodiment, the common descriptor file 302 is associated with data file 308. As described in greater detail herein, the common descriptor 302 may be embedded within the data file 308 as illustrated in the storage device 202 of FIG. 2. In various embodiments, common descriptor file 302 comprises a set of non-vendor-specific formatting information elements 304 and a set of vendor-specific formatting information elements 306. As described in greater detail hereinbelow, the set of common descriptor elements 304 comprise typical formatting information elements needed to read the common descriptor file and describe data file 308. The set of vendor-specific formatting information elements 306 will preferably include a collection of elements that describe the formatting of the associated data file 308. It will be appreciated that these elements will likely be unique to each vendor and may define the structure needed to read the specific data format used by that vendor.

Figure 4:
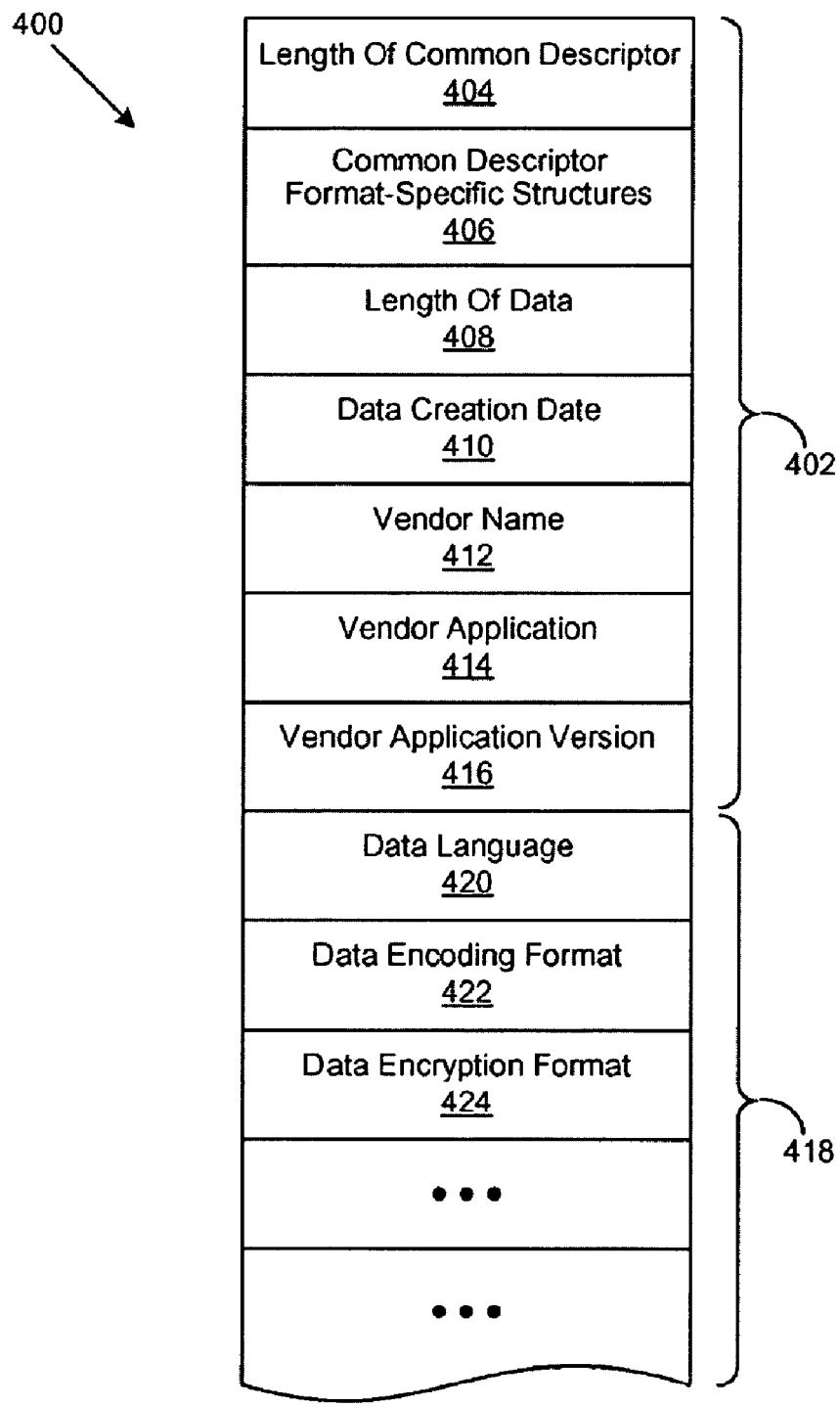
FIG. 4 is a simplified block diagram of the contents of a common descriptor file as implemented in accordance with an embodiment of the invention.

FIG. 4 is a simplified block diagram of the contents of a common descriptor file 400 as implemented in accordance with an embodiment of the invention. In one embodiment, the common descriptor file 400 comprises a set of non-vendor-specific formatting information elements 402 and a set of vendor-specific formatting information elements 418. The non-vendor-specific formatting information elements 402 comprise data block 404, listing the length of the common descriptor, and data block 406, which comprises other common descriptor format-specific structures if required. The non-vendor-specific formatting information elements 402 also comprise data block 408, listing the length of data file 308, and data block 410, stating the creation date of data file 308. In addition, the non-vendor-specific formatting information elements 402 also comprise data block 412, listing the name of the vendor associated with the application software used to create data file 308, data block 414, listing the name of that application software, and data block 416, listing the version of the application software used. It will be apparent to skilled practitioners of the art that the non-vendor-specific formatting information elements 402 may include more or fewer data blocks.

The set of vendor-specific formatting information elements 418 comprise data block 420, listing the language used to write data file 308, data block 422, listing the encoding format for data file 308, and data block 424, listing the encryption format for data file 308. It will be appreciated that the contents of the set of non-vendor-specific formatting information elements 402 will differ vendor-to-vendor, and that the elements illustrated are not the complete range of possible elements that could be included. The contents of the set of non-vendor-specific formatting information elements 402 will include more or fewer elements as needed to describe the vendor-specific data format. For example, some vendors may not encrypt their data and therefore may not require data block 424 in their set of vendor-specific formatting information elements 418. Similarly, some vendors may want to include an additional data block listing compilation or configuration information associated with data file 308.

Figure 5:
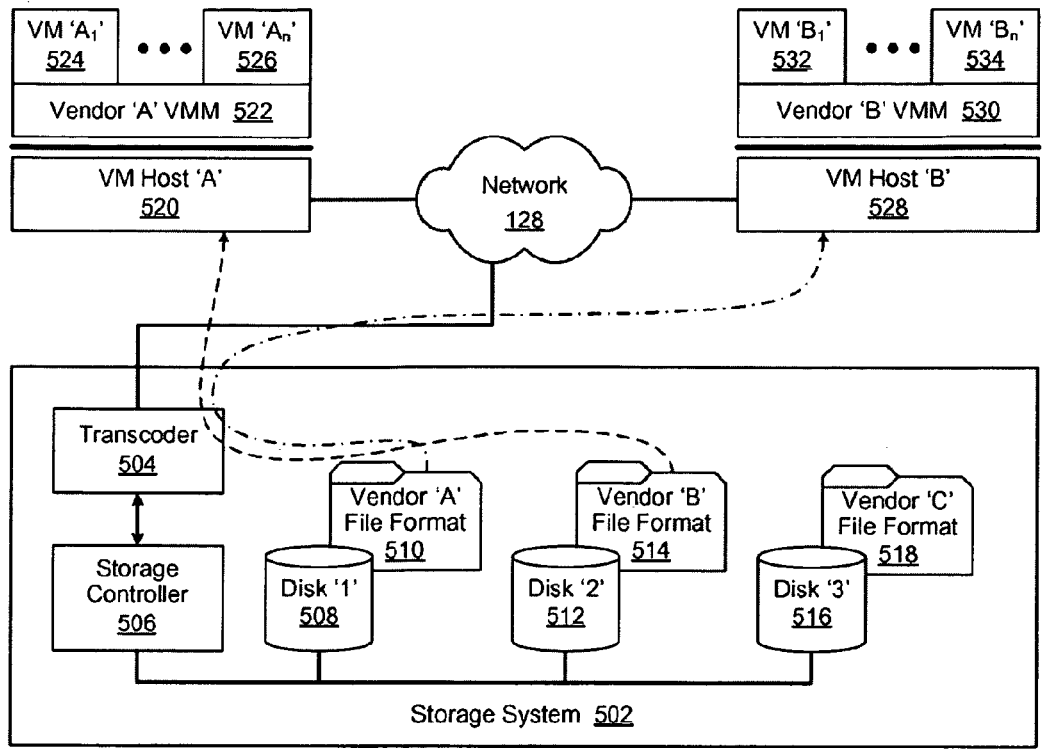
FIG. 5 is a simplified block diagram of a data format transcoder as implemented with a storage system in accordance with an embodiment of the invention.

FIG. 5 is a simplified block diagram of a data format transcoder 504 as implemented with a storage system 502 in accordance with an embodiment of the invention. In this embodiment, data format transcoder 504 is implemented in storage system 502 and is connected to storage controller 506. The storage controller 506 is connected to storage devices disk '1' 508, disk '2' 512, and disk '3' 516, which respectively contain data stored in file formats for vendor 'A' 510, vendor 'B' 514, and vendor 'C' 518. Data format transcoder 504 is connected to network 128, which in one embodiment is a storage area network (SAN). In other embodiments, network 128 is a physical network, such as a local area network (LAN) based on the Ethernet standard, a wide area network (WAN), such as the Internet or a corporate intranet, or any combination of telecommunication technologies and protocols operable to communicate data. Data format transcoder 504 services data requests through network 128 from virtual machine (VM) host 'A' 520 and VM host 'B' 528, which are likewise connected to network 128.

The VM host 'A' 520 comprises a virtual machine manager (VMM), also known as a hypervisor, provided by vendor 'A' 522, which manages the execution of VM 'A$_1$' 308 through VM 'A$_n$' 310. The VM host 'B' 528 similarly comprises a VMM provided by vendor 'B' 530, which manages the execution of VM 'B$_1$' 532 through VM 'B$_n$' 534. Skilled practitioners of the art will realize that the execution of VM 'A$_1$' 524 through VM 'A$_n$' 526 requires that each of the VM 'A$_1$' 524 through VM 'A$_n$' 526 reside in a file that is in vendor 'A' file format 510. Likewise, the execution of VM 'B$_1$' 532 through VM 'B$_n$' 534 requires that each of the VM 'V$_1$' 532 through VM 'B$_n$' 534 reside in a file that is in vendor 'B' file format 514. As an example, if the virtual execution environment provided by the vendor 'A' VMM 522 is based on technologies provided by VMWare, then VM 'A$_1$' 524 through VM 'A$_n$' 526 are required to be contained in the Virtual Machine DisK (VMDK) file format. Conversely, if the virtual execution environment provided by the vendor 'B' VMM 530 is based on technologies provided by Microsoft, then VM 'B$_1$' 532 through VM 'B$_n$' 534 are required to be contained in the Virtual Hard Disk (VHD) file format. To further the example, a VM that is contained in the VHD file format cannot be executed by a VMM provided by VMWare and a VM that is contained in the VMDK file format cannot be executed by a VMM provided by Microsoft.

However, there are times when a VM that is configured in one file format needs to be executed to respond to a service request, yet no resources are available in the virtual execution environment that uses that file format. If resources are available in a virtual execution environment that uses a different file format, then it may be possible to convert the VM from its current file format to the file format used by the other virtual execution environments. However, current approaches to such file conversions are more suited to data migration than dynamic data file transfer requests. In one embodiment, the data format transcoder addresses this issue by first receiving a request for data from a data requester, such as the vendor 'A' VMM 522. The desired format of the requested data is determined, followed by the location of a common descriptor file containing formatting information describing the requested format. Once located and retrieved, the common descriptor of the requested format is loaded into the data format transcoder 504. Then the data format transcoder 504 issues commands to the storage controller 506 to retrieve the requested data in its native format along with its corresponding common descriptor.

The data format transcoder 504 then reads the sets of non-vendor-specific and vendor-specific formatting information elements from the common descriptor. Then the data format transcoder 504 determines whether the requested data's native format is the same as the requested format. If it is not, the data format transcoder 504 uses the sets of non-vendor-specific and vendor-specific formatting information elements in the common descriptor of the requested format to perform transcoding operations to convert the requested data from its native format into the requested format. These transcoding operations, as used herein, refer to the digital-to-digital conversion of data stored in a first format into the same data stored in a second format. In various embodiments, the transcoding operations allow data to work on a different platform or operating system. The data format transcoder then transfers the requested data in its transcoded format to the data requester. However, if it is determined that the native format of the requested data is the same as the requested format, then the requested data is transferred in its native format to the data requester.

As an example, the vendor 'A' VMM 522 places a request with the data format transcoder 504 for data stored in its vendor 'A' format. The data format transcoder issues commands to the storage controller 506 to retrieve the requested data along with its associated common descriptor. The data format transcoder then compares the common descriptor file associated with the requested file format of vendor 'A' to the common descriptor associated with the requested data, which is stored in vendor 'B' file format 514. Since the formatting information contained in the two common descriptors do not match, the data format transcoder then uses the formatting information in the common descriptor of the requested format to transcode the requested data from its native format to the requested format. The requested data, transcoded from vendor 'B' file format 514 to the requested file format of vendor 'A', is then provided by the file format transcoder to the vendor 'A' VMM 522 that placed the data request.

As another example, the vendor 'B' VMM 530 places a request with the data format transcoder 504 for data stored in its vendor 'B' format. The data format transcoder issues commands to the storage controller 506 to retrieve the requested data along with its associated common descriptor. The data format transcoder then compares the common descriptor file associated with the requested file format of vendor 'B' to the common descriptor associated with the requested data, which is stored in vendor 'A' file format 510. Since the formatting information contained in the two common descriptors do not match, the data format transcoder then uses the formatting information in the common descriptor of the requested format to transcode the requested data from its native format to the requested format. The requested data, transcoded from vendor 'A' file format 510 to the requested file format of vendor 'B', is then provided by the file format transcoder to the vendor 'B' VMM 530 that placed the data request.

Figure 6:
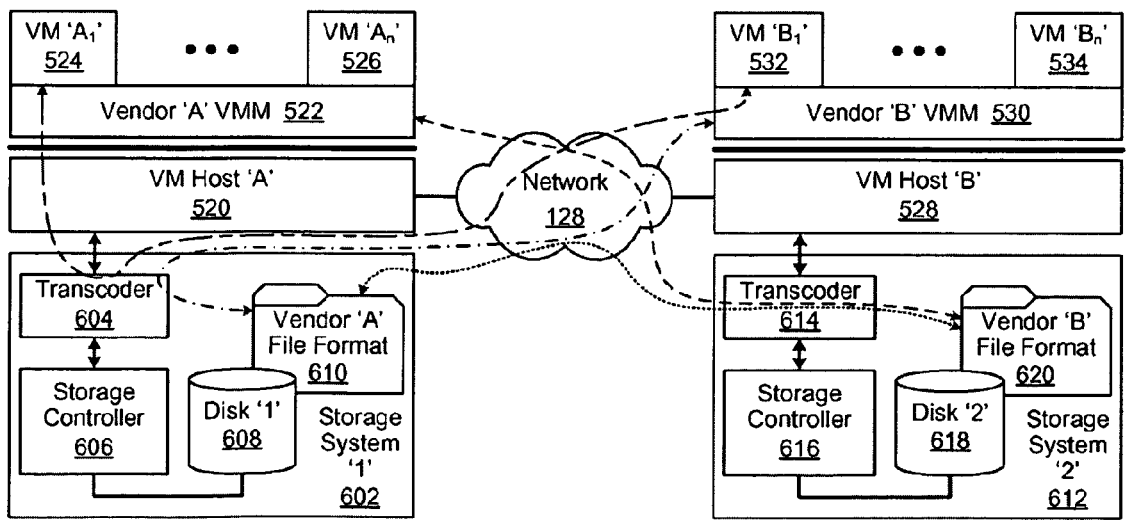
FIG. 6 is a simplified block diagram of a data format transcoder as implemented with a virtual machine (VM) host in accordance with an embodiment of the invention.

FIG. 6 is a simplified block diagram of a data format transcoder 604, 614 as implemented with a virtual machine (VM) host 520, 528 in accordance with an embodiment of the invention. In this embodiment, VM host 'A' 520 is connected through network 128 to VM host 'B' 528. In various embodiments, network 128 is a physical network, such as a local area network (LAN) based on the Ethernet standard, a wide area network (WAN), such as the Internet or a corporate intranet, or any combination of telecommunication technologies and protocols operable to communicate data. The VM host 'A' 520 comprises a virtual machine manager (VMM), also known as a hypervisor, provided by vendor 'A' 522, which manages the execution of VM 'A$_1$' 308 through VM 'A$_n$' 310. The VM host 'B' 528 similarly comprises a VMM provided by vendor 'B' 530, which manages the execution of VM 'B$_1$' 532 through VM 'B$_n$' 534.

The VM host 'A' 520 further comprises storage system '1' 602 and similarly, The VM host 'B' 528 further comprises storage system '2' 612. The storage system '1' 602 comprises data format transcoder 604 and storage controller 606, which is connected to storage devices disk '1' 608 containing data stored in file formats for vendor 'A' 610. The storage system '2' 612 comprises data format transcoder 614 and storage controller 616, which is connected to storage devices disk '2' 618 containing data stored in file formats for vendor 'B' 620.

As described in greater detail herein, data format transcoder 604 is operable to receive a request from the vendor 'B' VMM 530 requesting data in its vendor 'B' file format. The data format transcoder 604 locates a common descriptor file associated with the requested vendor 'B' file format. The data format transcoder then issues commands to the storage controller 606 to retrieve the requested data in its native file format along with its associated common descriptor. The requested data is then transcoded from its vendor 'A' file format 610 to the requested vendor 'B' file format. The transcoded data is then provided to the vendor 'B' VMM 530 that requested it.

Similarly, data format transcoder 614 is operable to receive a request from the vendor 'A' VMM 522 requesting data in its vendor 'A' file format. The data format transcoder 614 locates a common descriptor file associated with the requested vendor 'A' file format. The data format transcoder then issues commands to the storage controller 616 to retrieve the requested data in its native file format along with its associated common descriptor. The common descriptor of the requested data is then used to read the requested data in its native file format. The requested data is then transcoded from its vendor 'B' file format 620 to the requested vendor 'A' file format. The transcoded data is then provided to the vendor 'A' VMM 522 that requested it.

In one embodiment, the transcoding of data file formats is physical-to-physical (P2P). In this embodiment, the requested data is retrieved from its location on a first physical storage device and transcoded from a first format to a second, requested format. The requested data is then provided in its transcoded, second format to the requester and stored on a second physical storage device. In another embodiment, the transcoding of data file formats is physical-to-virtual (P2V). In this embodiment, the requested data is retrieved from its location on a physical storage device and transcoded from a first format to a second, requested format. The requested data is then provided in its transcoded, second format to the requester and executed in a virtual execution environment.

In yet another embodiment, the transcoding of data file formats is virtual-to-physical (V2P). In this embodiment, the requested data is retrieved from its virtual execution environment and transcoded from a first format to a second, requested format. The requested data is then provided in its transcoded, second format to the requester and stored on a physical storage device. In a different embodiment, the transcoding of data file formats is virtual-to-virtual (V2V). In this embodiment, the requested data is retrieved from a first virtual execution environment and transcoded from a first format to a second, requested format. The requested data is then provided in its transcoded, second format to the requester and executed in a second virtual execution environment.

Figure 7:
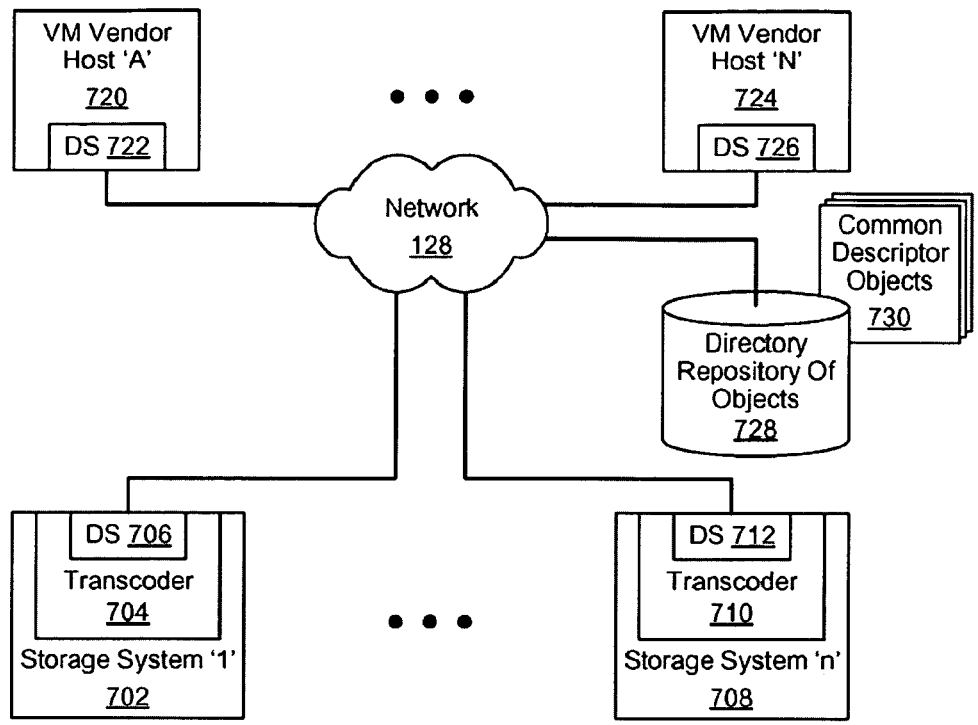
FIG. 7 is a simplified block diagram of a data format transcoder as implemented with a directory services repository in accordance with an embodiment of the invention.

FIG. 7 is a simplified block diagram of a data format transcoder 704, 710 as implemented with a directory services repository 728 in accordance with an embodiment of the invention. In this embodiment, virtual machine (VM) host 'A' 720 through VM host 'N' 724 are connected to each other through network 128. In various embodiments, network 128 is a physical network, such as a local area network (LAN) based on the Ethernet standard, a wide area network (WAN), such as the Internet or a corporate intranet, or any combination of telecommunication technologies and protocols operable to communicate data. The VM host 'A' 720 and VM host 'B' 724 respectively comprise a directory services stack 722, 726 providing access to the directory repository of objects 728.

In one embodiment, the directory repository of objects 728 comprises objects representing VM vendor hosts 'A' 720' and 'B' 724, storage systems '1' 702 and 'n' 708, and data format transcoders 706 and 712. In other embodiments, the directory repository of objects 728 also comprises objects representing storage devices, such as disk '1' 506, disk '2' 512, disk '3' 516. The directory repository of objects 728 likewise comprises objects representing data, such as data 308 of FIG. 3, and common descriptor files, such as common descriptor 302 of FIG. 3. In this embodiment, a plurality of storage systems '1' 702 through 'n' 708, each respectively comprising a data format transcoder 704 through 710, are connected to a plurality of VM vendor hosts 'A' 720 through 'N' 724. The data format transcoders 704 through 710 respectively comprise a directory service stack 706 through 712, providing access to the directory repository of objects 728.

In one embodiment VM vendor host 'N' 724 receives a service request requiring the execution of a VM with a predetermined configuration. Using the directory services stack 726, the VM vendor host 'N' 724 queries the directory repository of objects 728 and determines the VM with the required configuration is stored in a file contained in storage system '1' 702. The VM vendor host 'N' 724 then submits a request for the VM file to the data format transcoder 704 of storage system '1' 702. The data format transcoder 704 receives the request from VM vendor host 'N' 724 for data in its vendor 'N' file format. The data format transcoder then uses its directory services stack 706 to query the directory repository of objects 728 for the common descriptor object 730 associated with the requested vendor 'N' file format. Formatting information contained in the properties and attributes of the retrieved common descriptor object 730 associated with the requested vendor 'N' file format is then loaded into the data format transcoder 704. The data format transcoder 704 then issues commands to the storage controller of storage system '1' 702 to retrieve the requested data in its native file format along with its associated common descriptor. The common descriptor of the requested data is then used to read the requested data in its native file format. Then the formatting information obtained from the properties and attributes of the retrieved common descriptor object 730 is used by the data format transcoder 704 to transcode the requested data from its native file format to the requested vendor 'N' file format. The transcoded data is then provided to the vendor 'N' VMM 722 that requested it.

Figure 8:
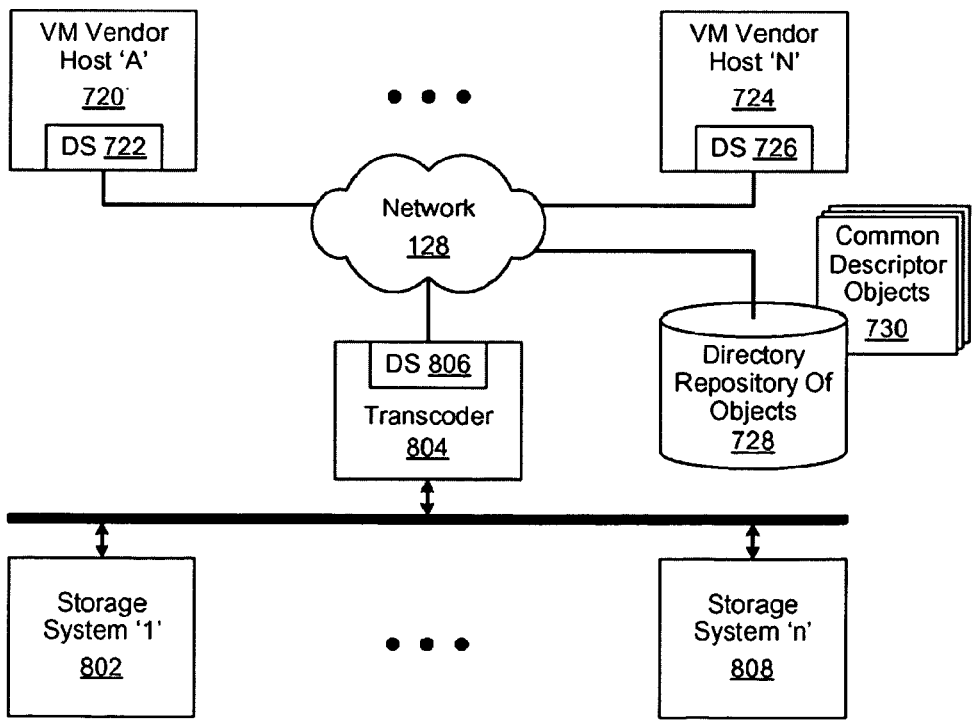
FIG. 8 is a simplified block diagram of a data format transcoder as implemented in a stand-alone configuration in accordance with an embodiment of the invention.

FIG. 8 is a simplified block diagram of a data format transcoder 804 as implemented in a stand-alone configuration in accordance with an embodiment of the invention. In this embodiment, virtual machine (VM) host 'A' 720 through VM host 'N' 724 are connected to each other through network 128. In various embodiments, network 128 is a physical network, such as a local area network (LAN) based on the Ethernet standard, a wide area network (WAN), such as the Internet or a corporate intranet, or any combination of telecommunication technologies and protocols operable to communicate data. The VM host 'A' 720 and VM host 'B' 724 respectively comprise a directory services stack 722, 726 providing access to the directory repository of objects 728.

In one embodiment, the directory repository of objects 728 comprises objects representing VM vendor hosts 'A' 720' and 'B' 724, storage systems '1' 702 and 'n' 708, and data format transcoders 706 and 712. In other embodiments, the directory repository of objects 728 also comprises objects representing storage devices, such as disk '1' 506, disk '2' 512, disk '3' 516. The directory repository of objects 728 likewise comprises objects representing data, such as data 308 of FIG. 3, and common descriptor files, such as common descriptor 302 of FIG. 3.

In this embodiment, a plurality of VM vendor hosts 'A' 720 through 'N' 724 are connected to data format transcoder 804, which comprises a directory services stack 806. In turn, the data format transcoder 804 is connected to a plurality of storage systems '1' 802 through 'n' 808. In one embodiment, the connection between the data format transcoder 804 and the plurality of storage systems '1' 802 through 'n' 808 is through a network, such as a storage area network (SAN). In other embodiments, the network connection can be through a physical network, such as a local area network (LAN) based on the Ethernet standard, a wide area network (WAN), such as the Internet or a corporate intranet, or any combination of telecommunication technologies and protocols operable to communicate data.

In one embodiment VM vendor host 'N' 724 receives a service request requiring the execution of a VM with a predetermined configuration. Using the directory services stack 726, the VM vendor host 'N' 724 queries the directory repository of objects 728 and determines the VM with the required configuration is stored in a file contained in storage system '1' 802. The VM vendor host 'N' 724 then submits a request for the VM file to the data format transcoder 804, which is connected to storage system '1' 802. The data format transcoder 804 receives the request from VM vendor host 'N' 724 for data in its vendor 'N' file format. The data format transcoder then uses its directory services stack 806 to query the directory repository of objects 728 for the common descriptor object 730 associated with the requested vendor 'N' file format. Formatting information contained in the properties and attributes of the retrieved common descriptor object 730 associated with the requested vendor 'N' file format is then loaded into the data format transcoder 804. The data format transcoder 804 then issues commands to the storage controller of storage system '1' 802 to retrieve the requested data in its native file format along with its associated common descriptor. The common descriptor of the requested data is then used to read the requested data in its native file format. Then the formatting information obtained from the properties and attributes of the retrieved common descriptor object 730 is used by the data format transcoder 804 to transcode the requested data from its native file format to the requested vendor 'N' file format. The transcoded data is then provided to the vendor 'N' VMM 722 that requested it.

Figure 9A:
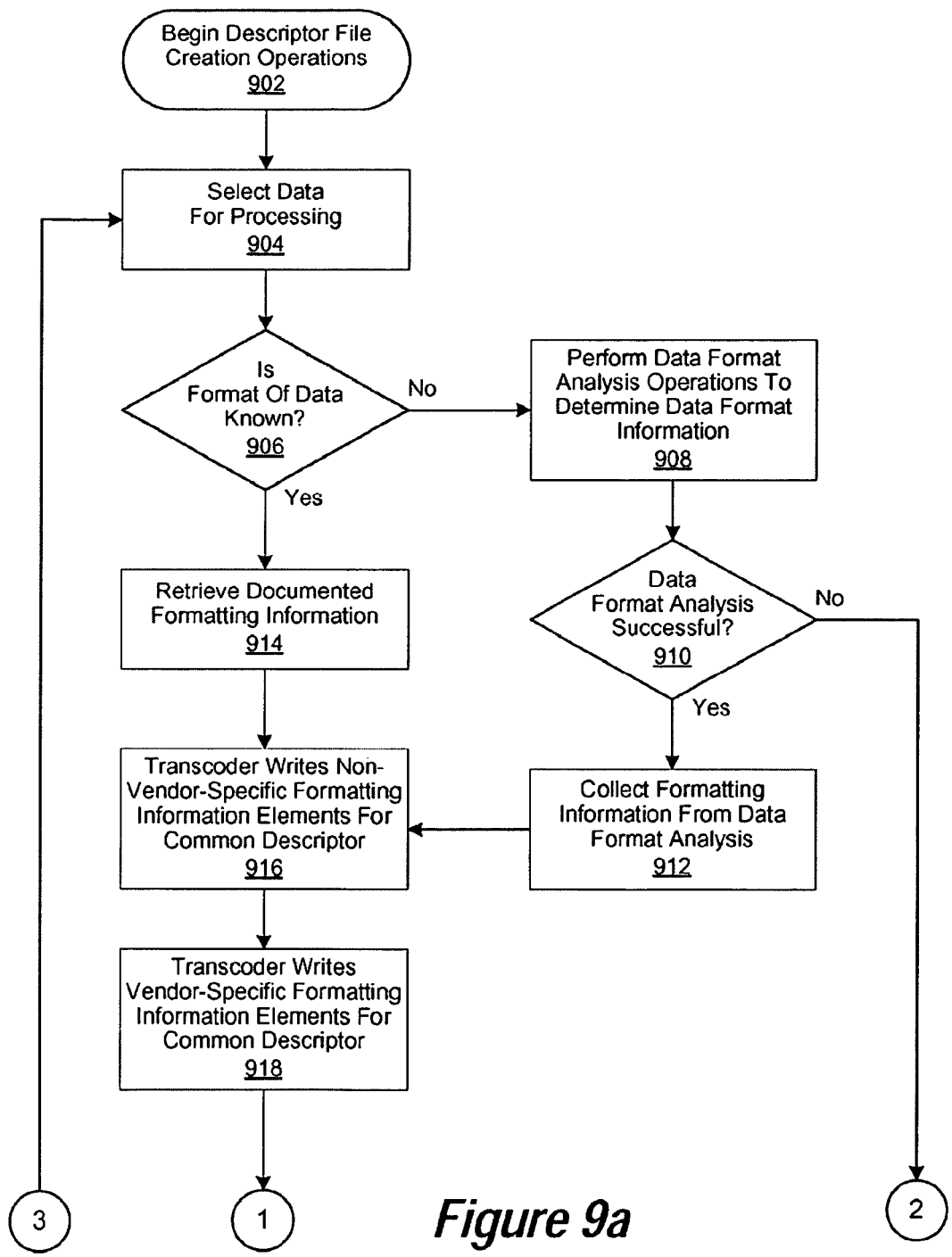
FIG. 9 is a generalized flowchart illustrating the creation of common descriptor files in accordance with an embodiment of the invention.
Figure 9B:
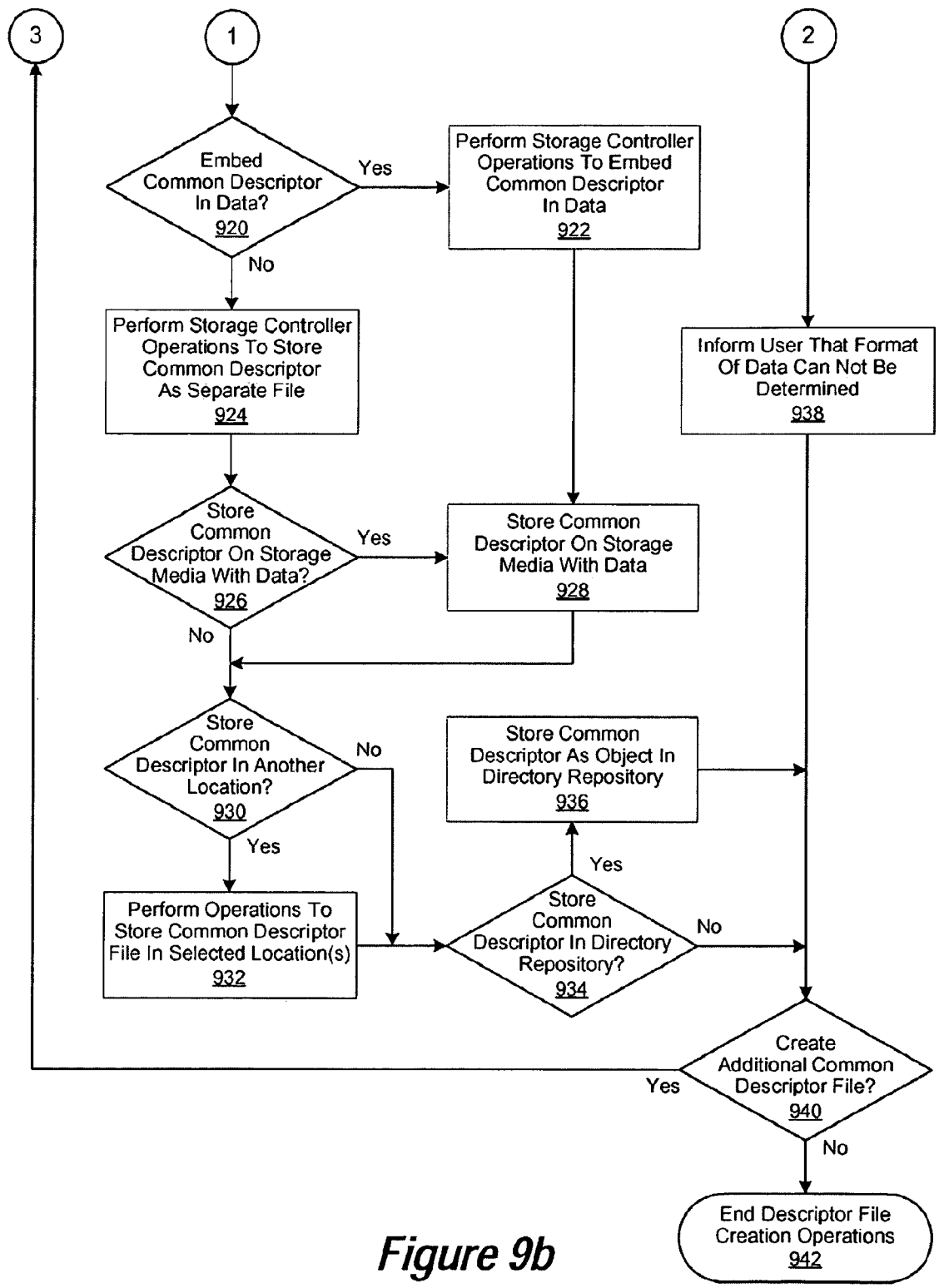

FIG. 9 is a generalized flowchart illustrating the creation of common descriptor files in accordance with an embodiment of the invention. In this embodiment, common descriptor file creation operation begins with step 902. Data stored on a storage medium, such as a Virtual Hard Disk (VHD) format file, a Virtual Machine DisK (VMDK) format file, or a tape archive (.tar) format file is selected for processing in step 904.

Once the data is selected, a determination is made in step 906 whether the format of the data is known. It will be apparent to those of skill in the art that the format of certain data files can be determined from their file extensions. For example, a data file with a .vhd extension can be presumed to be a data file stored in the Virtual Hard Disk format used in Microsoft virtualization environments. Similarly, a data file with a .vmdk extension can be presumed to be a data file stored in the Virtual Machine DisK format used in VMWare virtualization environments. In a like fashion, a data file with a .tar extension can be presumed to be a data file stored in the tape archive format typically used for archiving data. As another example, the format of the data may be known in advance as a result of knowledge of the application that generated the data. If it is determined in step 906 that the format of the data is known, then formatting information documenting the known data format is retrieved in step 914.

However, if it is determined in step 906 that the format of the selected data is not known, the data analysis operations familiar to those of skill in the art are performed on the data to determine data formatting information. A determination is then made in step 910 whether the data format analysis operations were successful. If the data format analysis operations were not successful, then the user is informed that the format of the selected data could not be determined in step 938. A determination is then made in step 940 whether to create an additional common descriptor file. If it is determined that another common descriptor file is to be created, then the process is repeated, beginning with step 904. Otherwise common descriptor file creation operations are ended in step 942. If, however, it is determined in step 910 that data format analysis operations were successful, then formatting information from the data format analysis operations of step 908 are collected in step 912.

Then, using the retrieved formatting information from step 914, or the collected formatting information of step 912, a data format transcoder writes the set of non-vendor-specific formatting information elements 802 illustrated in FIG. 8 to a common descriptor file for the selected data in step 916. Then, in step 918, the data format transcoder writes the set of vendor-specific formatting information elements 818 illustrated in FIG. 8 to the common descriptor file for the selected data.

A determination is then made in step 920 whether to embed the common descriptor within the selected data. If so, then storage controller operations familiar to skilled practitioners of the art are performed in step 922 to embed the common descriptor within the selected data. Once embedded, the data file with the embedded common descriptor is stored on the storage media of a storage device in step 928. However, if it is determined in step 920 to not embed the common descriptor within the selected data, then similar storage control operations are performed in step 924 to store the common descriptor as a separate file. A determination is then made in step 926 whether the separate common descriptor file will be stored on the same storage media as the selected data file. If so, then the separate common descriptor file is stored with the selected data on the storage media of a storage device in step 928.

However, regardless of whether it is determined in step 926 to store, or not to store, the common descriptor on the same storage media as the selected data, a determination is made in step 930 whether the common descriptor is to be stored in another location. If so, then operations are performed in step 932 to store the common descriptor in predetermined locations. As an example, the common descriptors may be stored in a storage device that is separate from their associated data. As another example, a single or small number of common descriptors may be sufficient to describe a large number of associated data files and duplication of the common descriptors is considered unnecessary. As still another example, the common descriptors may also be loaded into one or more storage controllers or one or more data format transcoders. Once the common descriptor is stored in the selected locations in step 932, or if it is determined in step 930 to not store the common descriptor in another location, a determination is made in step 934 whether to store the common descriptor in a directory services repository. If so, then directory service operations are performed in step 936 to store the common descriptor as an object in a directory services repository. Otherwise, or once the common descriptor is stored as an object in the directory service repository in step 936, a determination is then made in step 940 whether to create an additional common descriptor file. If it is determined that another common descriptor file is to be created, then the process is repeated, beginning with step 904. Otherwise common descriptor file creation operations are ended in step 942.

Figure 10A:
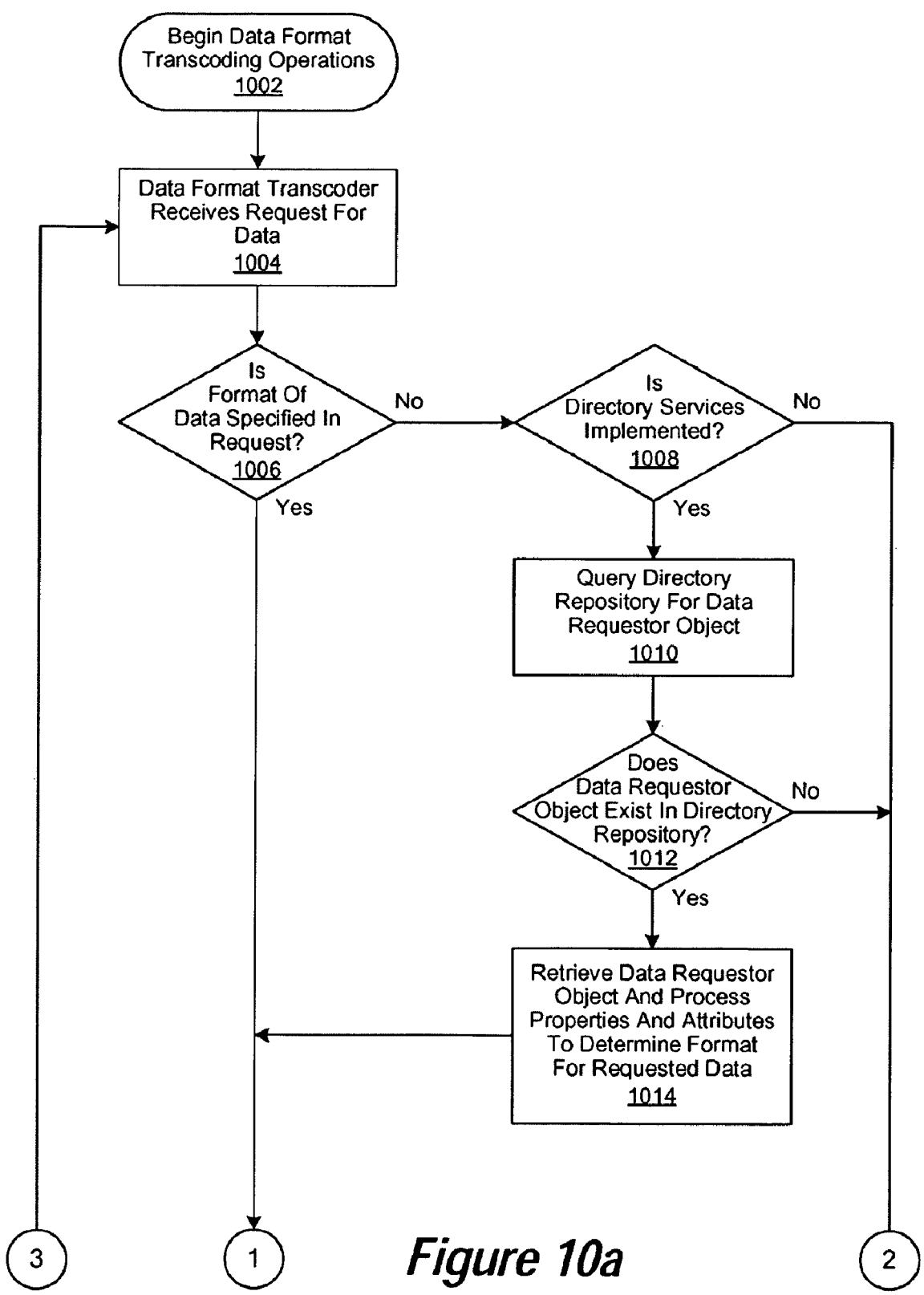
FIG. 10 is a generalized flowchart illustrating the use of common descriptor files in an embodiment of the invention for the transcoding of data formats.
Figure 10B:
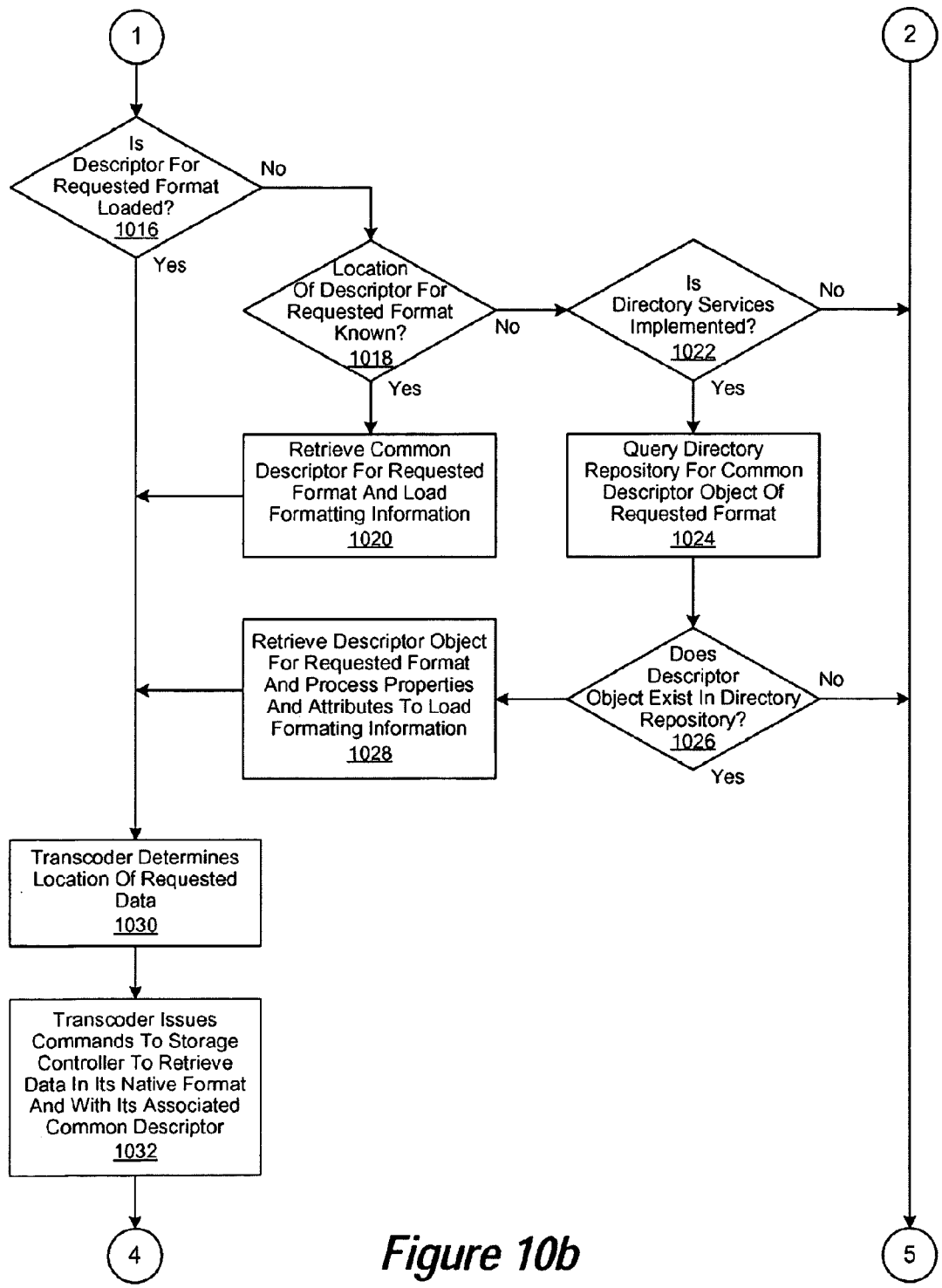
Figure 10C:
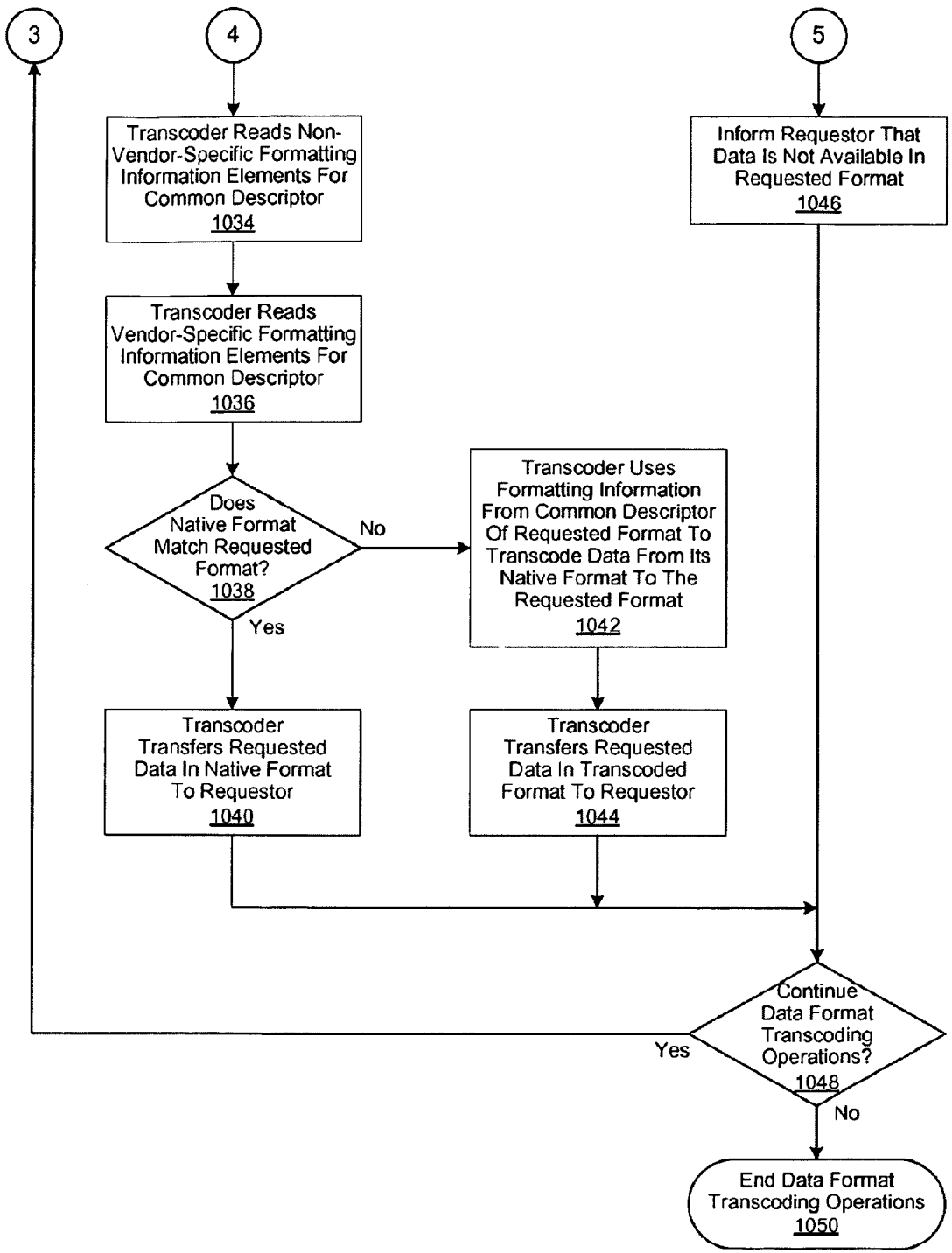

FIG. 10 is a generalized flowchart illustrating the use of common descriptor files in an embodiment of the invention for the transcoding of data formats. Data format transcoding operations are begun in step 1002 followed by a data format transcoder receiving a request for data in step 1004. A determination is then made in step 1006 whether the format of the requested data is specified in the request. If it is determined in step 1006 that the format of the requested data is not specified in the request, then a determination is made in step 1008 whether directory services are implemented and available to the data format transcoder. If not, then the data requestor is informed in step 1046 that the data is not available in the requested format. A determination is then made in step 1048 whether to continue data format transcoding operations. If it is determined in step 1048 to continue data format transcoding operations, then the process is repeated, beginning with step 1004. Otherwise, data format transcoding operations are ended in step 1050.

However, if it is determined in step 1008 that directory services have been implemented and are available, then one or more directory services repositories are queried in step 1010 to locate an object representing the data requester. A determination is then made in step 1012 whether an object representing the data requester has been located. If not, then the data requestor is informed in step 1044 that the data is not available in the requested format. A determination is then made in step 1046 whether to continue data format transcoding operations. If it is determined in step 1046 to continue data format transcoding operations, then the process is repeated, beginning with step 1004. Otherwise, data format transcoding operations are ended in step 1048.

If it is determined in step 1012 that an object representing the data requester has been located, then it is retrieved with a directory service and transferred to the data format transcoder. Once received, the data format transcoder processes properties and attributes of the data requestor object to determine the format of the requested data. As an example, the properties of the data requester object may indicate that the data requester is a virtual machine manager (VMM), or hypervisor, running on a physical host. The attributes of the properties may further indicate that the VMM is produced by VMWare and that the VMM requires virtual machine (VM) files in the stored in the Virtual Machine DisK (VMDK) format used in VMWare virtualization environments. From this information, the data format transcoder can determine that the requested data, while not specified in the request, needs to be provided in the VMDK file format.

A determination is then made in step 1016 whether the common descriptor corresponding to the requested data format is currently loaded in the data format transcoder. If it is not, then a determination is made in step 1018 whether the location of the common descriptor for the requested format is known. As an example, a data format transcoder may be implemented with a look-up table listing the storage locations of multiple common descriptors. If it is determined in step 1018 that the location of the common descriptor for the requested format is known, then it is retrieved from its known location in step 1020. Once retrieved, its corresponding sets of non-vendor-specific and vendor-specific formatting information is loaded into the data format transcoder.

However, if it is determined in step 1018 that the location of the common descriptor for the requested format is not known, a determination is made in step 1022 whether directory services are implemented and available to the data format transcoder. If not, then the data requestor is informed in step 1046 that the data is not available in the requested format. A determination is then made in step 1048 whether to continue data format transcoding operations. If it is determined in step 1048 to continue data format transcoding operations, then the process is repeated, beginning with step 1004. Otherwise, data format transcoding operations are ended in step 1050.

However, if it is determined in step 1022 that directory services have been implemented and are available, then one or more directory services repositories are queried in step 1024 to locate an object representing the common descriptor of the requested format. A determination is then made in step 1026 whether an object representing the data requestor has been located. If not, then the data requester is informed in step 1046 that the data is not available in the requested format. A determination is then made in step 1048 whether to continue data format transcoding operations. If it is determined in step 1048 to continue data format transcoding operations, then the process is repeated, beginning with step 1004. Otherwise, data format transcoding operations are ended in step 1050.

If it is determined in step 1026 that an object representing the common descriptor of the requested format has been located, then it is retrieved with a directory service and transferred to the data format transcoder. Once received, the data format transcoder processes properties and attributes of the object representing the common descriptor of the requested format and loads the corresponding non-vendor-specific and vendor-specific formatting information into the data format transcoder.

Once the formatting information has been entered into the data format transcoder as a result of steps 1020 or 1028, or if it is determined in step 1016 that it is already loaded, the data format transcoder determines the location of the requested data in step 1030. In one embodiment, the location of the requested data is specified in the data request. In another embodiment, the data format transcoder queries one or more storage controllers to determine the location of the requested data. In yet another embodiment, the data format transcoder implements a directory service to query a directory service repository for objects representing the requested data. If found, the properties and attributes of the requested data object are processed to determine the location of the requested data.

Once the location of the requested data has been determined, the data format transcoder issues commands in step 1032 to the corresponding storage controller to retrieve the requested data in its native format along with its corresponding common descriptor. The data format transcoder then reads the set of non-vendor-specific formatting information elements from the common descriptor in step 1034, followed by reading the set of vendor-specific formatting information elements in step 1034. Once the sets of non-vendor-specific and vendor-specific formatting information elements have been read, a determination is made in step 1038 whether the requested data's native format is the same as the requested format. If it is not, the data format transcoder uses the sets of non-vendor-specific and vendor-specific formatting information elements in step 1042 to transcode the requested data from its native format to the requested format. The data format transcoder then transfers the requested data in its transcoded format to the data requester in step 1044. However, if it is determined that the native format of the requested data is the same as the requested format, then the requested data is transferred in its native format to the data requester in step 1040. As a result of the requested data being transferred in steps 1040 or 1044 to the data requester, a determination is then made in step 1048 whether to continue data format transcoding operations. If it is determined in step 1048 to continue data format transcoding operations, then the process is repeated, beginning with step 1004. Otherwise, data format transcoding operations are ended in step 1050.

The systems and methods for implementing a common descriptor format described herein has been described with reference to pairs of common descriptor files and data files, and common descriptors embedded within the data. However, skilled practitioners of the art will realize that a single common descriptor file could be used for each individual storage device or individual storage medium, regardless of the number of data files on that storage device or medium. This common descriptor file could, for example, describe a generic file format for a vendor, with a standardized length, language, and location for each data file. As a result, every data file on that particular storage device or medium would conform to the common descriptor file format included on the storage device or medium. Similarly, the transcoding of data from one file format to another as described herein is not limited to virtual machine (VM) files. In different embodiments, any number of file formats (e.g., .tar archive file format) may be transcoded from one format to another.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

What is claimed is:

1. A system for transcoding data in a virtual machine (VM) environment, comprising:
   a storage medium having data stored thereon in a first VM data format, said data having a common descriptor associated therewith, said common descriptor comprising information describing said first VM data format;
   a storage controller coupled to a data storage device comprising said storage medium, said storage controller configured to control the transfer of data to and from said data storage device;
   a VM data format transcoder comprising processing logic configured to:
      receive a request to provide data in a second VM data format;

submit instructions to said storage controller to transfer said data and its said associated common descriptor to said VM data format transcoder;

process said associated common descriptor to determine if said first VM data format is the same as said requested second VM data format;

transcode said data from said first VM data format to said requested second VM data format if said first VM data format is not the same as said requested second VM data format;

provide said data in said requested second VM data format.

2. The system of claim 1, further comprising:

a directory service repository comprising a plurality of objects representing said data, said common descriptor, said data storage device, said VM data format transcoder, and said storage controller; and a directory service configured to:

perform object management operations on the plurality of objects contained in the at least one directory service repository; and provide predetermined object information to said VM data format transcoder to perform VM data format transcoding operations.

3. The system of claim 1, wherein said common descriptor comprises at least one of:

a set of non-vendor-specific elements describing how said common descriptor is formatted; and a set of vendor-specific elements describing vendor-specific formatting features for said data.

4. The system of claim 1, wherein said common descriptor includes a data block describing at least one of:

the length of said common descriptor;

the length of the data;

the creation date of the data;

which software vendor is associated with the data;

which software program is associated with the data;

which version of the software program is associated with the data; and whether the data is encrypted.

5. The system of claim 1, wherein said first VM data format and said second VM data format is one of:

a Virtual Hard Disk (VHD) format;

a Virtual Machine DisK (VMDK) format; and a tape archive (tar) format.

6. The system of claim 1, wherein said VM data format transcoder is operable to:

determine said first VM data format;

generate formatting information describing said first VM data format; and create said common descriptor.

7. The system of claim 1, wherein said VM data format transcoder is embedded in said storage controller.

8. The system of claim 1, wherein said VM data format transcoder is a stand-alone device operable to submit said instructions to a plurality of said storage controllers, said instructions submitted through a connection to a network.

9. The system of claim 1, wherein a common descriptor associated with said requested second VM data format is represented as a common descriptor object in said directory, said common descriptor object operable to be retrieved by said directory service and provided to said VM data format transcoder.

10. The system of claim 1, wherein said data stored in said first VM data format is stored on said storage medium of a first storage device, and wherein said data is transcoded by said VM data format transcoder to said requested second VM data format for at least one of the set of:

storage on said storage medium of a second storage device;

execution on a first virtual machine;

storage on a said storage medium of a second storage device; and execution in a second virtual machine.

11. A method for transcoding data in a virtual machine (VM) environment, comprising:

using a storage medium having data stored thereon in a first VM data format, said data having a common descriptor comprising information describing said first VM data format;

using a storage controller coupled to a data storage device comprising said storage medium, said storage controller configured to control the transfer of data to and from said data storage device;

using a VM data format transcoder comprising processing logic configured to:

receive a request to provide data in a second VM data format;

submit instructions to said storage controller to transfer said data and its said associated common descriptor to said VM data format transcoder;

process said associated common descriptor to determine if said first VM data format is the same as said requested second VM data format;

transcode said data from said first VM data format to said requested second VM data format if said first VM data format is not the same as said requested second VM data format;

provide said data in said requested second VM data format.

12. The method of claim 11, further comprising:

using a directory service repository comprising a plurality of objects representing said data, said common descriptor, said data storage device, said VM data format transcoder, and said storage controller; and using a directory service configured to:

perform object management operations on the plurality of objects contained in the at least one directory service repository; and provide predetermined object information to said VM data format transcoder to perform VM data format transcoding operations.

13. The method of claim 11, wherein said common descriptor comprises at least one of:

a set of non-vendor-specific elements describing how said common descriptor is formatted; and a set of vendor-specific elements describing vendor-specific formatting features for said data.

14. The method of claim 11, wherein said common descriptor includes a data block describing at least one of:

the length of said common descriptor;

the length of the data;

the creation date of the data;

which software vendor is associated with the data;

which software program is associated with the data;

which version of the software program is associated with the data; and whether the data is encrypted.

15. The method of claim 11, wherein said first VM data format transcoder is operable to:

determine said first VM data format;

generate formatting information describing said first VM data format; and create said common descriptor.

16. The method of claim 11, wherein said data format format transcoder is operable to:
- determine said first VM data format;
- generate formatting information describing said first VM data format; and
- create said common descriptor.

17. The method of claim 11, wherein said VM data format transcoder is embedded in said storage controller.

18. The method of claim 11, wherein said VM data format transcoder is a stand-alone device operable to submit said instructions to a plurality of said storage controllers, said instructions submitted through a connection to a network.

19. The method of claim 11, wherein a common descriptor associated with said requested second VM data format is represented as a common descriptor object in said directory, said common descriptor object operable to be retrieved by said directory service and provided to said VM data format transcoder.

20. The method of claim 11, wherein said data stored in said first VM data format is stored on said storage medium of a first storage device, and wherein said data is transcoded by said VM data format transcoder to said requested second VM data format for at least one of the set of:
- storage on said storage medium of a second storage device;
- execution on a first virtual machine;
- storage on a said storage medium of a second storage device; and
- execution in a second virtual machine.

* * * * *